June 15, 1965  J. D. BATTEN  3,188,964
CHANGE SPEED GEAR MECHANISM AND PUMPS THEREFOR
Filed April 16, 1962
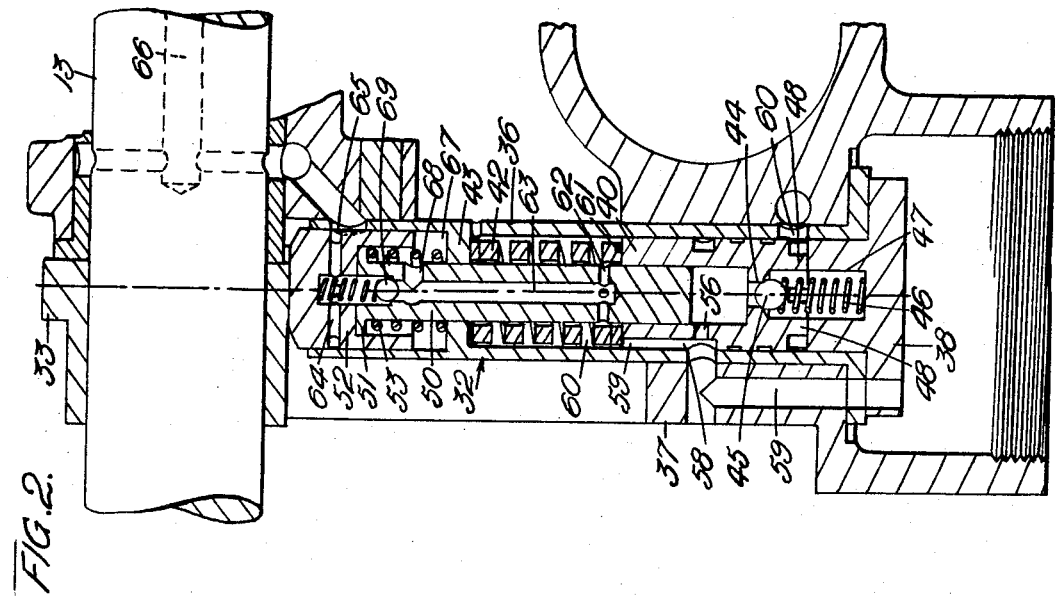
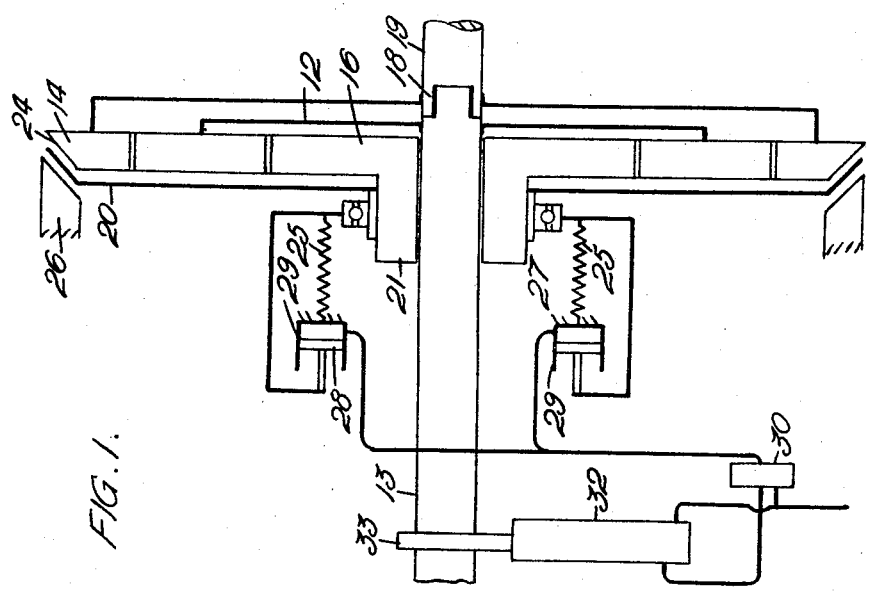

United States Patent Office 3,188,964
Patented June 15, 1965

3,188,964
CHANGE SPEED GEAR MECHANISM AND PUMPS THEREFOR
James Denne Batten, Coventry, England, assignor to Humber Limited, Coventry, England, a British company
Filed Apr. 16, 1962, Ser. No. 187,766
Claims priority, application Great Britain, Apr. 17, 1961, 13,803
1 Claim. (Cl. 103—4)

The invention relates to change speed gear mechanism of the kind in which at least one gear change is effected by means of a clutch or brake which is operated by hydraulic pressure derived from a positive action pump driven by the mechanism or by an engine or other part of a power transmission system incorporating the mechanism. The mechanism may be of the epicyclic type and in one commonly used construction there is a two-position friction clutch which, in one position, couples one member (e.g. a sun wheel) of the epicyclic mechanism to a fixed part such as a casing and in the other position locks up the mechanism to form a direct drive (e.g. by coupling the sun wheel to an annular gear). In this construction the clutch may be spring urged to one position and moved to the other position by the hydraulic pressure acting on one or more operating pistons or diaphragms. The application of the pressure may be controlled by a solenoid operated valve.

In change speed gear mechanisms of the above kind as at present used, the pump has, at any particular speed, a constant volume output. This output is only required when the clutch is being moved hydraulically and at other times the output is returned to the pump inlet or a reservoir through a pressure release valve.

According to the present invention a change speed gear mechanism of the above kind is characterized in that the pump has an output of which the volume is controlled by the output pressure, the volume decreasing with rise in pressure above a particular value. In this way the need for a pressure relief valve as above described, is obviated.

In a preferred form of the invention the pump has a piston working in a cylinder, the cylinder is axially movable under the pump output pressure acting axially on the cylinder against a spring and movement of the cylinder on increase in pressure moves an inlet port or valve to reduce the amount of fluid input to the pump during the suction stroke. The inlet valve may, for example, be provided by an inlet port in the cylinder wall which, during pumping operations, is uncovered by the piston near the end of the outward suction stroke and covered by the piston during the first part of the pumping stroke and movement of the cylinder as aforesaid may progressively move the port in the direction of the outward stroke and reduce the area of the port which is uncovered and, it may be, finally move the port to a position in which it remains covered by the piston and inlet of fluid to the pump is precluded, the pump then idling without output.

A preferred feature of the invention is that there is provided a second pump (e.g. arranged in tandem with the pump aforesaid) for supplying lubricant to the gear mechanism or other part.

A specific construction of a change speed gear according to the invention will now be described, by way of example, and with reference to the accompanying drawings in which:

FIGURE 1 is a diagram showing the gear arrangement, and

FIGURE 2 is a section through the pump used for producing hydraulic operating pressure and a supply of lubricant under low pressure.

The mechanism is intended to provide an overdrive for use in a motor vehicle power transmission system and embodies a two-speed epicyclic gear of which the engine drives the planet carrier 12, fixed to input shaft 13, the annulus 14 is the output member and the sun wheel 16 is rotatable on the input shaft 13 to the gear. There is a one-way clutch 18 between the input shaft 13 and the output shaft 19. There is also a two-position friction cone clutch of which the movable member 20 is splined to the hub 21 of the sun wheel. In one position of the movable member it engages a clutch face 24 on the annulus. The member is spring-urged to this position by compression springs 25. In the other position the member 20 engages a clutch face 26 on a fixed casing. The member may be urged to this position by hydraulic pressure acting on one or more pistons or flexible diaphragms 28 (in this case two pistons) and under the control of a solenoid operated valve 30. The cylinders 29 containing the pistons 28 are fixed. The spring and hydraulic forces are transmitted to the clutch member 20 through a ball thrust bearing 27. The first position aforesaid provides a direct drive and the second an over-drive.

To provide the hydraulic pressure there is a pump 32 which is driven by a cam 33 on the engine or input shaft 13 to the gear mechanism. This pump comprises a fixed outer sleeve 36 which is held in a bracket 37 with its axis radial to the camshaft 13. The outer end of the sleeve 36 (i.e. the end further from the camshaft) is closed by a plug 38. An inner sleeve 40, which acts as the pump cylinder, is slidable within the outer sleeve 36 and is urged into contact with the plug by a stiff spring 42 acting between the inner sleeve and a fixed internal flange 43 in the outer sleeve located at about two-thirds of the length thereof from the plug. As already stated the inner sleeve 40 serves as the pump cylinder and the sleeve is closed at the end adjacent the plug—its outer end—except for an axial outlet port 44 having an automatic non-return outlet ball valve 45, the ball being urged onto its seat by a spring 46 partly housed in a socket 47 in the plug. Clearance is maintained between the end of the cylinder and the plug by prongs or projections 48 on the cylinder head.

Working in the cylinder 40 and guided by the internal flange 43 there is a piston 50 in the form of a rod. The rod has an enlarged head 51 between the internal flange 43 and the cam 33, and there is a cap 52 which fits over the head 51. The cap engages the cam and is held in contact therewith by a spring 53 between the head 51 on the piston rod and the internal flange 43. The cap is a working fit in the end of the outer sleeve 36 remote from the plug and serves the additional purpose later described.

There is an inlet port 56 through the wall of the inner sleeve or cylinder 40 at a position where it is uncovered by the piston just before the end of its outward stroke (i.e. its stroke away from the closed end of the cylinder) when the projections on the cylinder are in contact with, or nearly in contact with, the plug (i.e. as shown in FIGURE 2). This port registers with a larger port 58 in the outer sleeve which communicates, through passageway 59, with a reservoir (not shown) for hydraulic fluid or oil.

There is an outlet port 60 from the outer sleeve 36 adjacent the plug and leading via the solenoid controlled valve 30 to the clutch operating pistons and cylinders 28, 29 or diaphragms.

In the operation of the pump, as so far described, the piston 50 is reciprocated by the cam and, until a predetermined output or back pressure is reached, fluid is drawn in through the inlet port 56 and discharged through the outlet port 44 and non-return valve 45. When a predetermined back pressure is reached this, acting between the plug 38 and the closed end of the cylinder 40, moves the cylinder away from the plug against the spring 42. This moves the inlet port 56 towards the outer end of the piston stroke and with progressive increase in pressure the port is first moved to a position in which it is only partly uncovered by the piston, thereby reducing the pump output and finally to a position in which it is not uncovered at all and there is no input to the pump so that its output falls to nothing. This would be the condition when the solenoid valve is shut or when it is open and the clutch has been moved to the limit of its stroke.

The inner sleeve or cylinder 40 has an external axial groove 59 connecting the inlet port 58 in the outer sleeve to the space 60 between the open end 61 of the cylinder and the internal flange 43, this being the space housing the stiff spring 42. Close to the open end 61 of the cylinder 50, the piston 50 has a transverse throughway 62 which leads to an axial bore 63 in the piston. The throughway is spaced from the open end 61 of the cylinder, when the cylinder is against the plug and the piston is at the end of its outward stroke, by less than the length of the stroke so that the throughway enters the cylinder towards the end of the inward stroke of the piston. The axial bore 63 terminates at a transverse throughway 64 in the piston rod cap, which leads to a port 65 in the outer sleeve which, in turn, leads through a passageway to an axial bore 66 in the driving shaft.

Between the two transverse throughways 62, 64 there is a third such throughway 68 in the piston rod which connects the bore in the piston rod to the space 67 in the outer sleeve between the piston head and the internal flange. There is a non-return ball valve 69 in the part of the bore between this third throughway and that, 64, in the cap, the valve permitting flow from the space to the bore 66 in the driving shaft.

The arrangement just described constitutes a low pressure pump for lubricant to the various parts of the gear. When the cylinder is in contact with the plug (as shown), the transverse bore 62 nearest to the cylinder, which constitutes the lubricant pump inlet, is covered at the end of the piston stroke only and the pump is operative with a minimum output. However, when the cylinder is moved away from the plug, as it normally will be in operation, the inlet to the low pressure pump enters into the cylinder earlier in the piston stroke and a greater quantity of lubricant is trapped in the space between the piston head 51, 52 and the flange 43 and is pumped to the shaft whence it is taken to parts requiring lubrication.

In the pressure pump described, the non-delivery condition is obtained when the inlet port 56 is maintained fully closed by the cylinder whereas in the lubricant pump full delivery is obtained at the designed working pressure of the pressure pump.

It is within the invention to omit the lubricant pump in cases where no low pressure supply of lubricant is required.

I claim:

A piston type pump having a pump piston working in a pump cylinder which is axially movable under the pump output pressure acting axially on the cylinder, increase in the pressure moving the cylinder to cover an inlet port to the cylinder to reduce the amount of fluid input to the cylinder during the suction stroke, a stationary abutment, a spring acting between the cylinder and the cylinder and the stationary abutment resiliently to resist only such axial movement of the cylinder, a second spring acting between said piston and said stationary abutment to urge the piston in a direction to uncover said inlet port, and a low-pressure piston pump arranged in tandem therewith comprising said pump piston.

References Cited by the Examiner

UNITED STATES PATENTS

| | | | |
|---|---|---|---|
| 1,932,921 | 10/33 | Bizzarri | 103—37 |
| 2,010,165 | 8/35 | Tear | 103—37 |
| 2,041,422 | 5/36 | L'Orange | 103—37 |
| 2,433,220 | 12/47 | Huber | 103—40 |
| 2,916,999 | 12/59 | Christenson | 103—40 |
| 2,919,597 | 1/60 | Borman. | |
| 3,130,674 | 4/64 | Budzich | 103—37 |

LAURENCE V. EFNER, *Primary Examiner.*

DON R. WAITE, *Examiner.*